March 14, 1950 — D. F. TROUPE — 2,500,219
STEAM FOOD DEFROSTER
Filed April 21, 1947 — 3 Sheets-Sheet 1
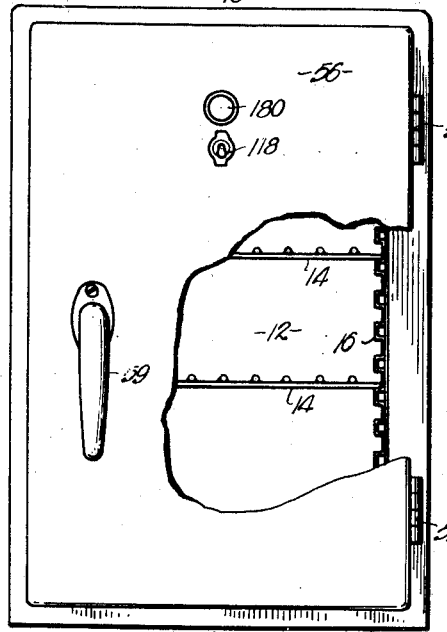
Fig. 1.
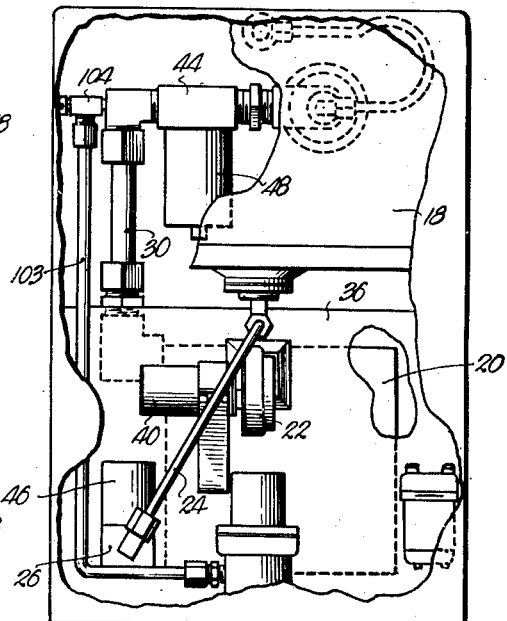
Fig. 2.
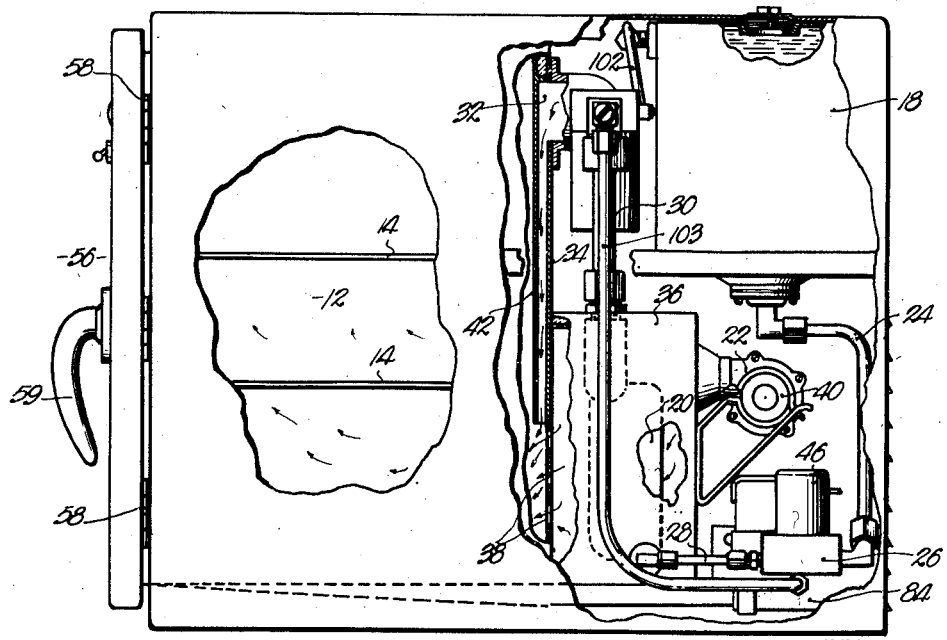
Fig. 3.
INVENTOR.
Donald F. Troupe
BY 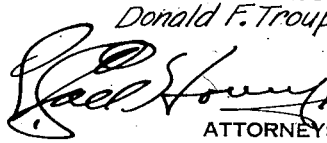
ATTORNEYS.

March 14, 1950      D. F. TROUPE      2,500,219
STEAM FOOD DEFROSTER

Filed April 21, 1947      3 Sheets-Sheet 2

INVENTOR.
Donald F. Troupe

BY

ATTORNEYS.

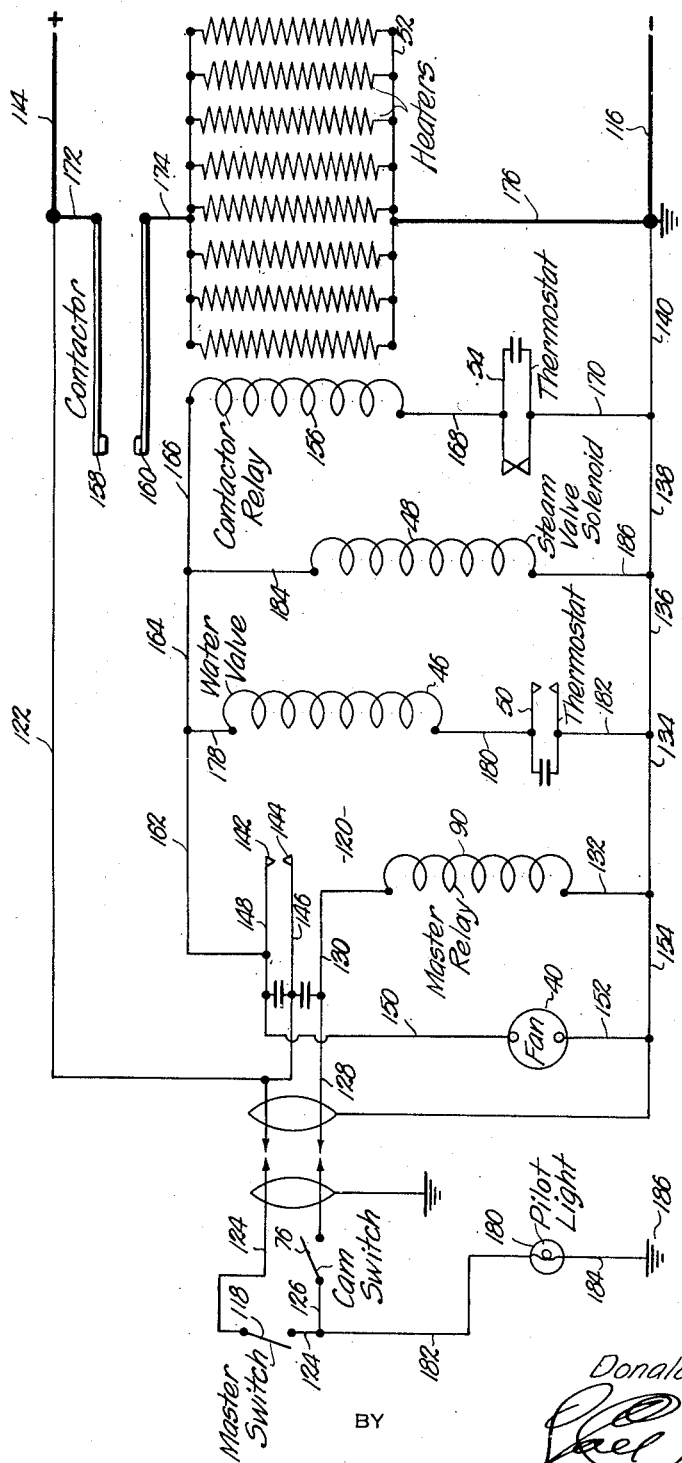

Patented Mar. 14, 1950

2,500,219

UNITED STATES PATENT OFFICE 2,500,219

STEAM FOOD DEFROSTER

Donald F. Troupe, Kansas City, Mo., assignor to The Vendo Company, Kansas City, Mo., a corporation of Missouri Application April 21, 1947, Serial No. 742,920

11 Claims. (Cl. 219—39)

This invention relates to appliances used in the preparation of foods and more particularly to a steam food defroster, the primary aim being to provide such an appliance that is compact, easy to operate and inexpensive to manufacture.

The most important object of this invention is to provide a steam food defroster having a compartment for the food to be treated and a steam generating boiler having connection with the steam compartment, said boiler being provided with a jacket into which is directed a stream of air passable into the compartment for circulating the steam therein.

Another important object of this invention is to provide a steam food defroster having a wall provided with an inlet opening at one end thereof, a plurality of openings at the opposite end thereof and means for directing the steam entering the compartment through said first-mentioned opening toward the stream of air entering said last mentioned openings.

A further object of this invention is to provide a steam defroster having a weight actuated pressure valve for automatically evacuating the steam compartment of excess steam and mechanism associated therewith and operable by a unique door latching assembly for clearing the compartment of all steam prior to opening of its door.

A still further object of this invention is to provide a steam food defroster having a water reservoir for supplying water to the steam generating boiler wherein is mounted a thermostatically controlled valve for permitting the passage of water into the boiler when the latter reaches a predetermined temperature.

Other objects of this invention include the way in which pressure equalization in the water reservoir is obtained by use of the steam from the boiler, the manner in which all the aforesaid thermostats, valves, fan and heating element are controlled by the door latch mechanism, and the way in which all the component parts of the assembly are assembled into a compact unit.

Many additional objects of this invention will be made clear or become apparent during the course of the following specifications, reference being had to the accompanying drawings wherein:

Figure 1 is a front-elevational view of the steam food defroster made in accordance with my present invention, parts being broken away for clearness.

Fig. 2 is a rear-elevational view thereof, parts being broken away to reveal details of construction.

Fig. 3 is a side-elevational view thereof, parts being broken away and portions thereof being in section for clearness.

Fig. 8 is a schematic view of the wiring diagram for the electrical system forming a part of the defroster.

Figure 4:
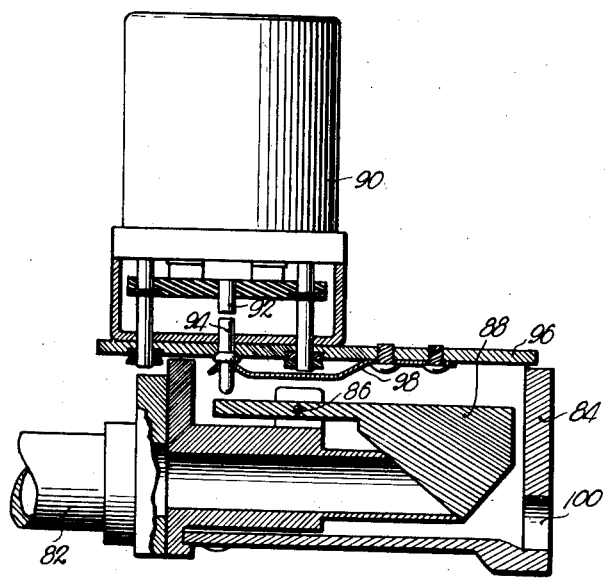
Fig. 4 is a fragmentary, detailed, enlarged view of the pressure valve assembly showing the same partially in section.
Figure 5:
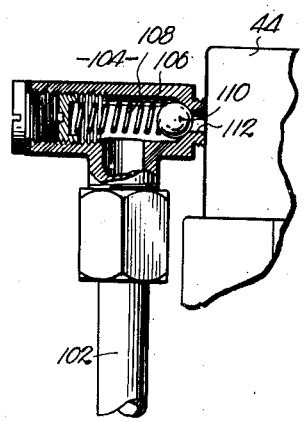
Fig. 5 is an enlarged, fragmentary, sectional, detailed view of the relief valve per se.

It is contemplated that the steam food defroster, about to be described, be adapted for use primarily in airplane galleys. It is common knowledge that food served to airplane passengers is automatically pre-cooked and carried by the airplane in a frozen condition. It becomes necessary therefore to provide means for defrosting such food, which means is also capable of further cooking such food if desired. Space being an important factor, as well as weight, the steam food defroster, forming the subject matter of this application, is therefore designed in view of these problems as will hereinafter be more fully set forth.

In the drawings a cabinet generally designated by the numeral 10 has a compartment 12 at one end thereof of double wall construction to provide suitable means for receiving insulation (not shown). A number of shelves 14 within the compartment 12 are slidably supported through the medium of brackets 16 in the usual manner. Cabinet 10 carries, in addition to compartment 12, a water reservoir 18, a steam generating boiler 20 and a fan 22. Water reservoir 18 is placed into communication with the boiler 20 through the medium of a pipe or conduit 24 having a valve at the lower-most end thereof mounted within a housing 26. This valve is in communication with a short pipe 28, which pipe 28 is in turn connected to the boiler 20.

A pipe or conduit 30 leads from the upper end of the boiler 20 and communicates with an opening 32 formed in the back wall 34 of compartment 12. A jacket 36 completely surrounds the boiler 20 in spaced relation thereto and a portion of the wall 34 of compartment 12 forms one wall of this jacket 36. This portion of the wall 34 has a plurality of perforations therein as at 38 for placing the compartment 12 into communication with the jacket 36.

Fan 22, having a suitable electric motor 40, is disposed to direct streams of air into the jacket 36. A suitable opening in jacket 36 (not shown) places fan 22 in communication with the interior of jacket 36. It is clear that this fan 22 will direct streams of air against the hot boiler 20 through the perforations 38 and into the compartment 12.

A baffle plate 42 is mounted within the compartment 12 in spaced relation to wall 34 and extending across the entire width of compartment 12. This baffle plate 42 terminates directly above perforations 38 to the end that steam entering the inlet opening 32 will pass downwardly between plate 32 and wall 34 as indicated by arrows in Fig. 3. This steam will contact the stream of air entering perforations 38 and be circulated throughout the compartment 12.

A steam valve is interposed within the conduit 30 mounted in a housing 44. Each of the valves within housings 26 and 44 respectively are actuated by solenoids, the water valve in housing 26 having connection with a solenoid 46 and the steam valve within housing 44 being operated by a solenoid 48. A thermostat 50 is disposed within jacket 36 adjacent the boiler 20 for controlling the operation of solenoid 46 to thereby operate the water valve when the temperature of boiler 20 reaches a predetermined point. A suitable heat element 52 is disposed adjacent to the boiler 20 and this heat element is controlled by a thermostat 54.

Figure 6:
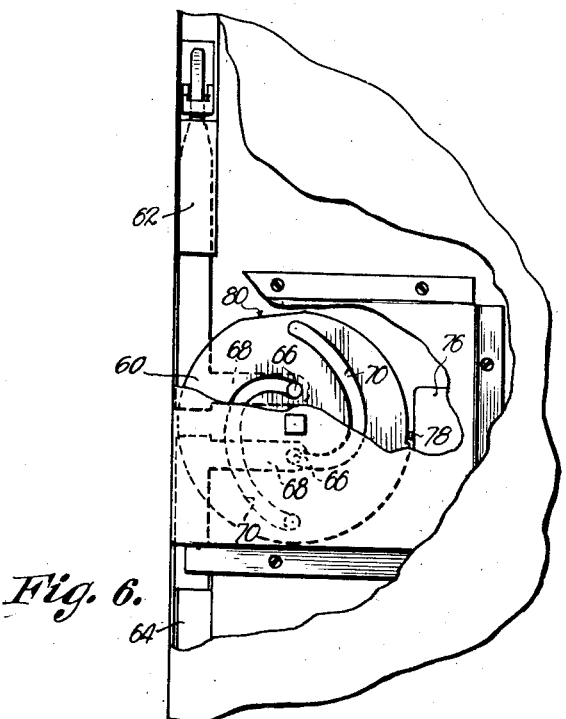
Fig. 6 is a fragmentary, elevational view of the compartment door, parts being broken away to reveal the door latch construction.
Figure 7:
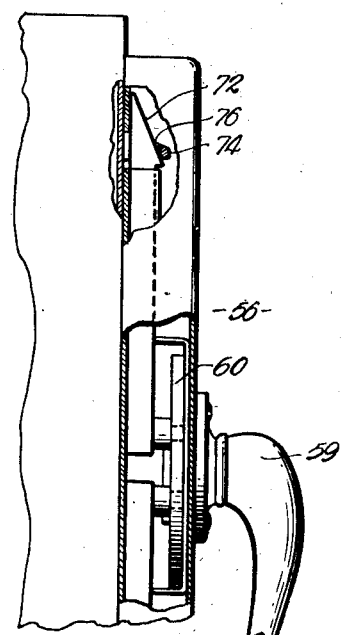
Fig. 7 is a fragmentary, side-elevational view of the door, parts being broken away to illustrate the manner in which the latching mechanism locks the door when in a closed position.

A door broadly designated by the numeral 56 is swingably mounted upon the cabinet 10 through the medium of hinges 58 and this door 56 is swingable to and from a position closing the compartment 12. Door 56 carries a conventional handle 59 and a substantially circular disc member 60 is mounted within this door 56 and joined to the handle 59. Door 56 also carries a pair of bars 62 and 64 reciprocable vertically in opposite directions. These bars 62 and 64 are substantially L-shaped and each carries a pin 66 at the free end of the leg 68 thereof. These pins 66 extend into a respective slot 70 formed in the disc 60. These slots 70 are all of peculiar arcuate design in the nature of that illustrated in Fig. 6 and rotation of the disc 60 by actuation of handle 59 causes the pins 66 to slide in the slots 70 and thereby reciprocate bars 62. The outermost free ends of each of the said bars 62 are beveled as at 72 and the cabinet 10 carries a pair of outwardly projecting extensions 74 having openings 76 therein for receiving the beveled ends 72 of the respective bars. The door 56 has a pair of openings (not shown) for receiving the extension 74 when the door 56 is moved to the closed position.

A master switch 76 mounted within the door 56 carries a plunger 78 in contacting relation with the edge of disc 60. Disc 60 normally holds this plunger 78 at the innermost end of its path of travel where switch 76 is in a position for closing a circuit hereinafter more fully described. When disc 60 is rotated clockwise, as viewed in Fig. 6, a flat portion 80 on this disc 60 is moved to a position adjacent to the plunger 78 of switch 76, permitting this plunger 78 to move outwardly and open the aforesaid circuit. It is notable at this juncture that the switch 76 is in the circuit opening and circuit closing position when the door 56 is open and closed respectively.

A conduit 82 is in communication with the compartment 12 at one end thereof and with a chamber 84 at its opposite end. This chamber 84 has swingably mounted therein, as at 86, a weighted valve 88 moveable to and from a position closing the open end of conduit 82 which terminates within the chamber 84.

A solenoid 90, mounted upon this chamber 84, has a plunger 92 reciprocable toward and from chamber 84 and this plunger 92 is provided with a spring or other yieldable means (not shown) for maintaining the same at the uppermost end of its path of travel away from chamber 84. When this solenoid 90 is energized, its plunger 92 is driven toward chamber 84 and against the action of its spring to a point where this plunger 92 contacts a pin 94. Pin 94 is slidably mounted within an opening formed in one wall 96 of chamber 84 and a leaf spring or the like 98 yieldably holds pin 94 at the uppermost end of its path of travel. Actuation of pin 94 by plunger 92 causes this pin 94 to contact weighted valve 84 whereupon the latter swings upon pivot 86 to open conduit 82. Condensate, steam, vapor or other matter passing from compartment 12 through conduit 82 enters chamber 84 when valve 88 is open and then passes outwardly through opening 100 formed in one wall of chamber 84.

In the event that it becomes necessary to mount the water tank 18 in a position where sufficient water will not be supplied to the boiler 20 by the action of gravity, equalized pressure is maintained in this tank 18 by connecting the same to the steam pipe 30. This connection is made through the medium of an equalizing tube 102. A pipe 103 interconnects the housing 44 having the aforesaid steam valve mounted therein and the chamber 84 as illustrated in Figs. 2 and 3 and a relief valve 104 is interposed in this pipe 103 adjacent to the housing 44. The valve 104 comprises a hollow head 106 having a spring 108 for yieldably urging a ball 110 to a position closing outlet opening 112 in head 106 which opening 112 is in direct communication with housing 44. In the event the pressure within the tube 30 becomes too great, valve 104 will automatically open to permit excess steam to flow from housing 44 into the valve housing 106 and thence into the pipe 103 where this steam is free to escape into chamber 84 and outwardly from opening 100. It is possible therefore to maintain a predetermined pressure within compartment 12 by merely adjusting the tension of spring 108 forming a part of relief valve 104.

Referring now to Fig. 8, the numerals 114 and 116 designate lead lines from a source of electrical energy such as a battery (not shown) and the numeral 118 designates a switch mounted on door 56 as illustrated in Fig. 1 for closing a circuit through the various electrically operated parts above described. Also as above set forth, cam actuated switch 76 is closed when door 56 is closed and handle 59 is actuated to the door locking position.

A circuit is therefore closed from lead line 114 to line 116 when switches 76 and 118 are closed to energize a master relay broadly designated by the numeral 120. This circuit is traced as follows:

From lead line 114, through wires 122 and 124, closed switch 118, wires 124 and 126, closed switch 76, wires 128 and 130, relay 120, wires 132, 134, 136, 138 and 140, to lead line 116.

It is notable that relay 120 is a master relay wound not only to constitute the solenoid 90 but to close contact points 142 and 144 forming a part of relay 120. Thus with switches 118 and 76 both closed, the solenoid 90 is maintained in an energized condition to the end that its plunger 92 is moved inwardly against the action of its spring so that valve 88 is free to swing on pivot 86.

With contact points 142 and 144 held closed by energization of relay 120, a number of circuits are closed and fan 22 is immediately energized through the following circuit:

From lead line 114, through wires 122 and 146, closed contact points 142 and 144, wires 148 and 150, motor 40 of fan 22, wires 152, 154, 134, 136, 138 and 140 to lead line 116.

Assuming that the boiler 20 and the heating element 52 therefor are relatively cool at the time switch 76 is closed, upon closing of door 56, the thermostat 54 will be in the closed condition illustrated in Fig. 8 to permit energization of a relay 156 for holding closed a pair of contactors 158 and 160, which contactors 158 and 160 in turn close a circuit through the heating element 52. The circuit for energizing the contactor relay 156 is traced as follows:

From lead line 114, through wires 122 and 146, closed points 142 and 144, wires 148, 162, 164, and 166, relay 156, wires 168, closed thermostat 54 and wires 170 and 140 to lead line 116.

With contactors 158 and 160 held closed by relay 156, the circuit for energizing the heaters 52 is traced as follows:

From lead line 114, through wire 172, closed contactors 158 and 160, wire 174, heating element 52 and wire 176 to lead line 116.

When the boiler 20 reaches a predetermined temperature, thermostat 50 will be closed permitting energization of solenoid 46 which in turn actuates the water valve within housing 26. The circuit energizing solenoid 46 is traced as follows:

From lead line 114, through wires 122 and 146, closed points 142 and 144, wires 148, 162 and 178, solenoid 46, wire 180, closed thermostat 50 and wires 182, 136, 138 and 140 to lead line 116.

Steam generated by boiler 20 is then free to flow into compartment 12 because the steam valve within housing 44 is held open by solenoid 48. This solenoid 48 is continuously energized through the following circuit:

From lead line 114 through wires 122 and 146, closed points 142 and 144, wires 148, 162, 164 and 184, solenoid 48 and wires 186, 138 and 140, to lead line 116.

When master switch 118 is closed, the operator is notified, through the medium of pilot light 180, that the above described circuits will be immediately closed upon closing of door 56. The circuit for this light 189 is traced as follows:

From lead line 114, through wires 122, 124, closed switch 118, wires 124 and 182, lamp 180 and wire 184 to ground 186.

The operation of the above described steam food defroster has been made clear as the component parts thereof where described and it is clear that opening of door 56 will de-energize all the circuits illustrated in Fig. 8. The heating element 52 will cease to operate, the steam valve within housing 44 will close to prevent entrance of further steam into compartment 12, and such steam as will continue to be generated by boiler 20, as the same cools, will escape through relief valve 104. The water valve within housing 26 will immediately close on de-energization of its solenoid 46 irrespective of the condition of thermostat 50 to prevent further flow of water from tank 18 to boiler 20. This flow of water will be checked both with respect to its gravitational flow and flow thereof induced by steam entering tank 18 through conduit 102. Obviously de-energization of relay 156 will open contacts 158 and 160 to de-energize heaters 52 and de-energization of relay 120 will not only open all the circuits including that of motor 40, but will de-energize solenoid 90 whereby valve 88 is automatically opened to evacuate compartment 12 prior to opening of door 56.

Having thus described the invention, what is claimed as new and desired to be secured by Letters Patent is:

1. A steam food defroster of the class described comprising a normally closed compartment for the food to be treated; a steam generating boiler; a water reservoir having connection with the boiler; a conduit for placing the boiler into communication with the compartment, said compartment having an access opening; a closure for said opening movable to and from a closed position; a latch for locking said closure in said closed position; a pressure valve for evacuating the compartment of excess pressure when the closure is in said position; and structure operable by said latch for actuating the valve as the latch is manually moved toward the unlocked position.

2. A steam food defroster of the class described comprising a normally closed compartment for the food to be treated; a steam generating boiler; a water reservoir having connection with the boiler; a conduit for placing the boiler into communication with the compartment, said compartment having an access opening; a closure for said opening movable to and from a closed position; a latch for locking said closure in said closed position; a pressure valve for evacuating the compartment of excess pressure; and structure operable by said latch for actuating the valve as the latch is manually moved toward the unlocked position, said compartment having an open end outlet pipe, said valve comprising a gate swingable by the action of gravity to a position normally closing said end of the pipe.

3. A steam food defroster of the class described comprising a normally closed compartment for the food to be treated; a steam generating boiler; a water reservoir having connection with the boiler; a conduit for placing the boiler into communication with the compartment, said compartment having an access opening; a closure for said opening movable to and from a closed position; a latch for locking said closure in said closed position; a pressure valve for evacuating the compartment of excess pressure; and structure operable by said latch for actuating the valve as the latch is manually moved toward the unlocked position, said compartment having an open end outlet pipe, said valve comprising a gate swingable by the action of gravity to a position normally closing said end of the pipe, said structure including a solenoid having a reciprocable plunger for actuating the swingable gate, said solenoid being inoperable when said latch is locked whereby said valve is free for actuation by excess pressure in the compartment.

4. A steam food defroster of the class described comprising a normally closed compartment for the food to be treated; a steam generating boiler; a water reservoir having connection with the boiler; a conduit for placing the boiler into communication with the compartment; a pressure valve adapted to evacuate the compartment of excess pressure; a solenoid for actuating the pressure valve, said compartment having an access opening and a closure for the opening; a switch for closing an electric circuit through the solenoid; and a latch movable to and from a position locking the closure in the closed position, said latch having means for moving the switch to and from a closed position as the latch is moved toward and from the locked position respectively, said solenoid having parts for actuating the valve when the solenoid is de-energized upon opening of said switch.

5. A steam food defroster of the class described comprising a compartment for the food to be treated, said compartment having an access opening, a closure for the opening, and a manually manipulable latch movable manually to and from a closure-locking position; a steam generating boiler having connection with the compartment; a heating element for the boiler; a water reservoir in communication with the boiler; a valve for controlling the flow of water to the boiler; a valve for controlling the flow of steam to the compartment; a fan for circulating the steam in the compartment; a valve for controlling evacuation of steam from the compartment; solenoids for each valve for actuating the same; a pair of thermostats for the water valve and the heating elements respectively for controlling the operation of said water valve and heating element; a control switch for closing circuits through said fan, all of said solenoids, both thermostats, and the heating element; and means forming a part of said latch for moving the switch to and from a closed position as the latch is moved toward and from a closure-locking position respectively, whereby said circuit is de-energized when the closure is unlocked.

6. In a steam food defroster of the class described, a steam compartment for the food to be treated, said compartment having an access opening in one side thereof; a door swingable to and from a position closing said opening; and a manually manipulable latch assembly for locking said door in the closed position, said assembly comprising a handle; a rotatable disc on the handle; a pair of reciprocable bars on the door; means interconnecting the disc and said bars for actuating the latter upon rotation of the disc by manual manipulation of said handle; and means on the compartment cooperable with said bars for holding the door closed when the bars are at one end of their paths of travel respectively; means for supplying said compartment with steam under pressure; and structure having electric control mechanism for evacuating the compartment, said disc having a cam surface disposed to actuate said mechanism to a position for operating said evacuating structure as the disc is rotated from the door-locking position toward a position unlocking the door.

7. In a steam food defroster of the class described, a normally closed steam compartment for the food to be treated; structure for supplying said compartment with steam under pressure; a fan for circulating the steam within the compartment, one wall of the compartment having an inlet opening for the steam at one end thereof and a plurality of perforations at the opposite end thereof, said fan being disposed to direct streams of air against said structure for heating thereby, through the openings and into the compartment; and means in the compartment for receiving steam from said inlet opening and directing the same toward the perforations and into the stream of air entering the compartment for circulation with the air in the compartment.

8. In a steam food defroster of the class described, a normally closed steam compartment for the food to be treated; means for supplying said compartment with steam under pressure; a fan for circulating the steam within the compartment, one wall of the compartment having an inlet opening for the steam at one end thereof and a plurality of perforations at the opposite end thereof, said fan being disposed to direct streams of air through the openings into the compartment; and means in the compartment for receiving steam from said inlet opening and directing the same toward the perforations and into the stream of air entering the compartment, said steam supply means including a steam generating boiler having a jacket enclosing the same, said jacket being interposed between the fan and said perforations in the wall whereby the air stream is directed against the boiler before entrance into the compartment.

9. In a steam defroster, a normally closed body having a part thereof adapted to contain food to be treated; a steam generating unit housed in said body; means for directing a current of air directly against the unit whereby the air is heated by the unit and circulated in the body; and structure for directing steam emanating from the unit into the path of travel of said current of air.

10. In a steam defroster of the class described, a normally closed compartment for the food to be treated; a steam generating boiler having connection with the compartment; a closed water supply reservoir having connection with the boiler; and means for automatically diverting part of the steam emanating from said boiler to the reservoir when pressure of steam in the compartment reaches a predetermined value.

11. In a steam defroster of the class described, a normally closed compartment for the food to be treated; a steam generating boiler having connection with the compartment; a closed water supply reservoir having connection with the boiler; means for automatically diverting part of the steam emanating from said boiler to the reservoir when pressure of steam in the compartment reaches a predetermined value; and means for automatically relieving the reservoir of steam pressure when the latter reaches a predetermined value in the reservoir.

DONALD F. TROUPE.

REFERENCES CITED

The following references are of record in the file of this patent:

UNITED STATES PATENTS

| Number | Name | Date |
|---|---|---|
| 1,643,538 | Bell | Sept. 27, 1927 |
| 1,682,448 | Vaughan | Aug. 28, 1928 |
| 2,035,679 | Thompson | Mar. 31, 1936 |
| 2,054,292 | Maddocks | Sept. 15, 1936 |
| 2,102,342 | Walder | Dec. 14, 1937 |
| 2,124,482 | Blair | July 19, 1938 |
| 2,154,021 | Abbate | Apr. 11, 1939 |
| 2,252,541 | Arnold | Aug. 12, 1941 |
| 2,280,894 | Cushman | Apr. 28, 1942 |